(12) United States Patent
Akashi

(10) Patent No.: US 11,252,379 B2
(45) Date of Patent: Feb. 15, 2022

(54) INFORMATION PROCESSING SYSTEM, INFORMATION PROCESSING METHOD, AND NON-TRANSITORY STORAGE MEDIUM

(71) Applicant: NEC Corporation, Tokyo (JP)

(72) Inventor: Ko Akashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/036,656

(22) Filed: Sep. 29, 2020

(65) Prior Publication Data

US 2021/0127093 A1 Apr. 29, 2021

(30) Foreign Application Priority Data

Oct. 29, 2019 (JP) .............................. JP2019-195829

(51) Int. Cl.
*H04N 7/18* (2006.01)
*H04M 11/02* (2006.01)

(52) U.S. Cl.
CPC .......... *H04N 7/186* (2013.01); *H04M 11/025* (2013.01); *H04N 7/181* (2013.01)

(58) Field of Classification Search
CPC ...... H04N 7/186; H04N 7/181; H04M 11/025
See application file for complete search history.

(56) References Cited

U.S. PATENT DOCUMENTS

| | | | | |
|---|---|---|---|---|
| 8,271,321 B1 * | 9/2012 | Kestenbaum | ........ | G06Q 50/163 705/14.1 |
| 2012/0116805 A1 * | 5/2012 | Cash, Jr. | ................ | G06Q 10/10 705/3 |
| 2013/0227437 A1 * | 8/2013 | Brody | ..................... | H04L 51/04 715/757 |
| 2015/0066557 A1 * | 3/2015 | Lichti | ...................... | G08G 1/20 705/7.15 |
| 2016/0300160 A1 * | 10/2016 | Klein | ..................... | G06Q 10/02 |
| 2018/0004463 A1 * | 1/2018 | Masumoto | .......... | H04N 1/4406 |
| 2019/0066014 A1 * | 2/2019 | Wang | ............... | G06Q 10/06311 |
| 2019/0325089 A1 * | 10/2019 | Golparvar-Fard | .......................... | G06F 3/04815 |
| 2020/0074361 A1 * | 3/2020 | Akatsuka | ............... | A61B 5/1118 |
| 2020/0202321 A1 * | 6/2020 | Nitsch | ..................... | G06Q 20/20 |
| 2020/0265228 A1 * | 8/2020 | Petluru | .................... | H04L 51/16 |
| 2020/0387758 A1 * | 12/2020 | Kobayashi | ......... | G06K 9/00362 |
| 2020/0402648 A1 * | 12/2020 | Ghosh | ............... | G06Q 10/0637 |
| 2021/0056486 A1 * | 2/2021 | Kawamukai | ....... | G05B 19/4183 |
| 2021/0200590 A1 * | 7/2021 | Harada | ................... | G06F 9/505 |
| 2021/0304085 A1 * | 9/2021 | Klein | .................... | G06Q 10/02 |

FOREIGN PATENT DOCUMENTS

| | | |
|---|---|---|
| JP | 2004-178277 A | 6/2004 |
| JP | 2014-067263 A | 4/2014 |
| JP | 2017-204096 A | 11/2017 |
| JP | 2019-046174 A | 3/2019 |

* cited by examiner

*Primary Examiner* — Jared Walker
(74) *Attorney, Agent, or Firm* — Sughrue Mion, PLLC

(57) ABSTRACT

The information processing system includes: an analysis unit that analyzes a demand level of a plurality of reception desks based on a correlation between time and a characteristic of a visitor or a characteristic of a related item acquired from a video including the visitor visiting at least one facility including a plurality of different types of reception desks or the related item related to the visitor; and a determination unit that determines a distribution of personnel to the plurality of reception desks based on the demand level.

12 Claims, 10 Drawing Sheets

FIG. 3
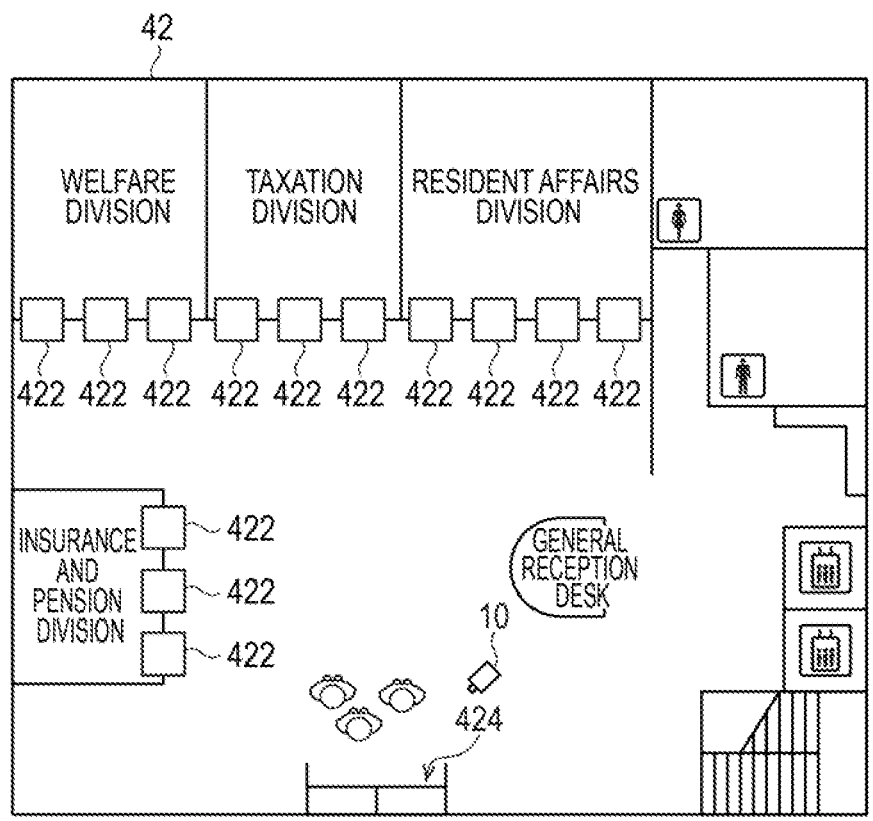
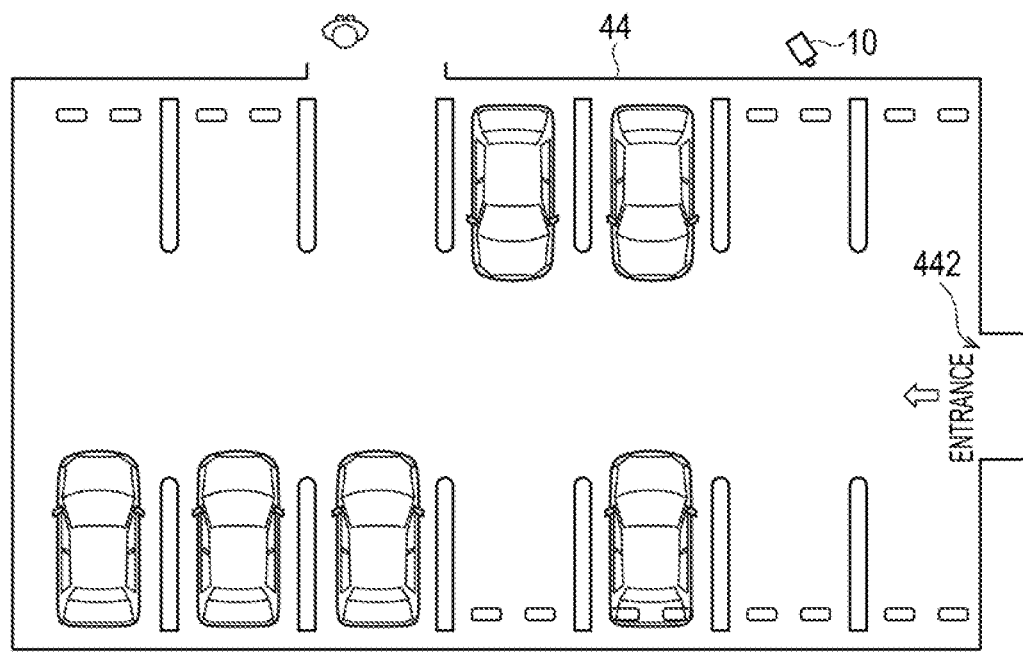

| STAFF ID | NAME | DEPARTMENT | STAFF-STATIONED FACILITY | SUITABLE OPERATION |
|---|---|---|---|---|
| a001 | XX XX | XXX DIVISION | CENTRAL OFFICE | XX OPERATION, XX OPERATION |
| a002 | XX XX | XXX DIVISION | XX BRANCH OFFICE | XX OPERATION |
| a003 | XX XX | XXX DIVISION | XX BRANCH OFFICE | XX OPERATION, XX OPERATION |
| ⋮ | ⋮ | ⋮ | ⋮ | ⋮ |

| FACILITY ID | NAME | TYPE | LOCATION INFORMATION | RECEPTION DESK |
|---|---|---|---|---|
| b001 | XXXXX | XXXXX | XXXXX | c001,c002,c003 |
| b002 | XXXXX | XXXXX | XXXXX | c004,c005 |
| b003 | XXXXX | XXXXX | XXXXX | - |
| | | ⋮ | | |

| WINDOW ID | TYPE | WINDOW-PROVIDED FACILITY | STAFF IN CHARGE |
|---|---|---|---|
| c001 | XXXXX | b001 | a002,a003 |
| c002 | XXXXX | b001 | a004,a005 |
| c003 | XXXXX | b001 | a006 |
| | | ⋮ | |

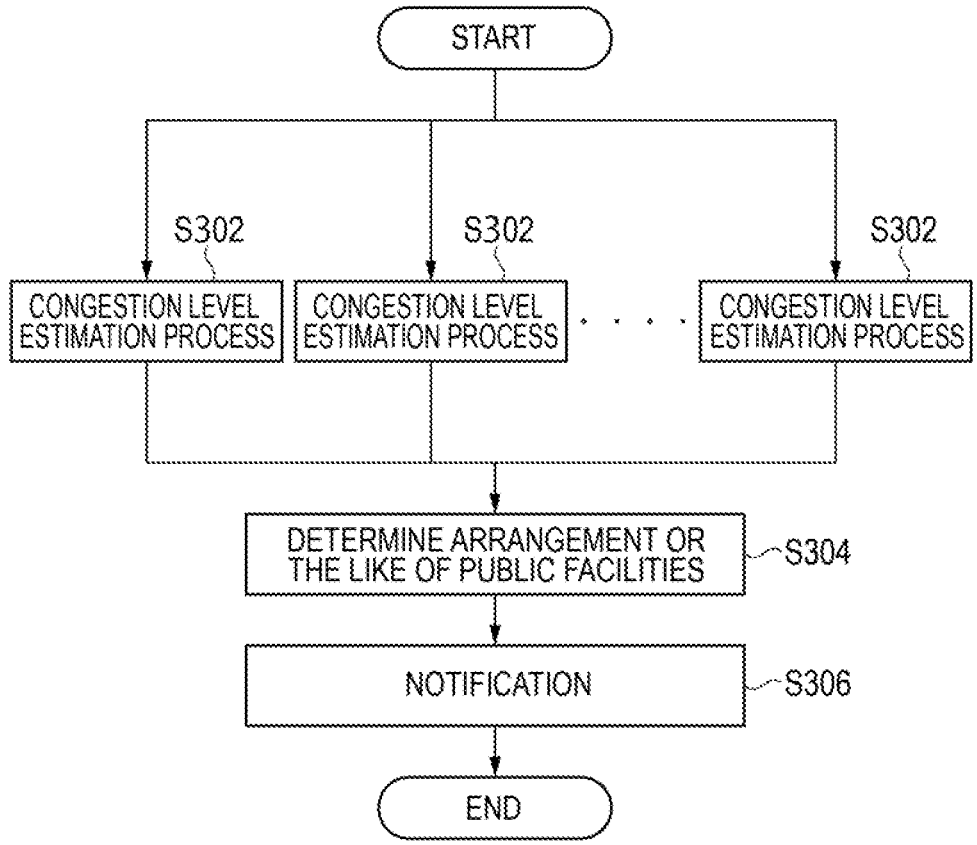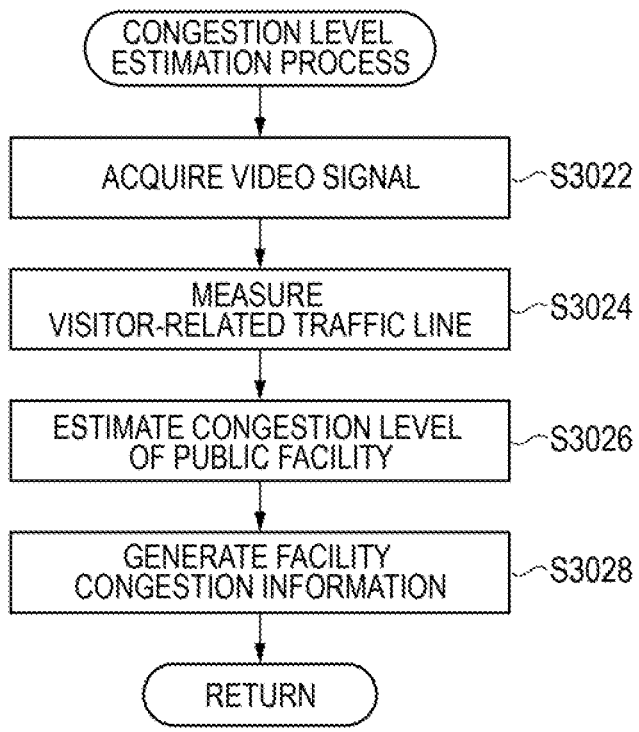

INFORMATION PROCESSING SYSTEM, INFORMATION PROCESSING METHOD, AND NON-TRANSITORY STORAGE MEDIUM

INCORPORATION BY REFERENCE

This application is based upon and claims the benefit of priority from Japanese Patent Application No. 2019-195829, filed on Oct. 29, 2019, the disclosure of which is incorporated herein in its entirety by reference.

TECHNICAL FIELD

The present invention relates to an information processing system, an information processing method, and a non-transitory storage medium.

BACKGROUND ART

Japanese Patent Application Laid-open No. 2004-178277 discloses a sales-floor plan support system that supports a sales-floor plan for achieving improvement of sales in a shop. The system disclosed in Japanese Patent Application Laid-open No. 2004-178277 calculates a parameter representing the process status of a register based on data of traffic lines of visiting customers in the sales-floor and sales data, determines a distribution of personnel who are in charge of registers in accordance with a result of comparison between the calculation result and a reference value, and facilitates change of the operation status of the registers. In addition, Japanese Patent Application Laid-open No. 2017-204096 is an example of the related art.

In the system disclosed in Japanese Patent Application Laid-open No. 2004-178277, however, only a distribution of personnel who are in charge of a plurality of registers having functions common to each other is determined, and it is therefore difficult to realize a more suitable distribution of personnel to a plurality of different types of reception desks.

SUMMARY

In view of the problem described above, the example object of the present invention is to provide an information processing system, an information processing method, and a non-transitory storage medium that can realize a more suitable distribution of personnel to a plurality of different types of reception desks.

According to one example aspect of the present invention, provided is an information processing system including: an analysis unit that analyzes a demand level of a plurality of reception desks based on a correlation between time and a characteristic of a visitor or a characteristic of a related item acquired from a video including the visitor visiting at least one facility including a plurality of different types of reception desks or the related item related to the visitor; and a determination unit that determines a distribution of personnel to the plurality of reception desks based on the demand level.

According to another example aspect of the present invention, provided is an information processing method including: analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and determining a distribution of personnel to the plurality of reception desks based on the demand level.

According to yet another example aspect of the present invention, provided is a non-transitory storage medium storing a program that causes a computer to perform: analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and determining a distribution of personnel to the plurality of reception desks based on the demand level.

BRIEF DESCRIPTION OF THE DRAWINGS

FIG. 3 is a schematic diagram illustrating an example of a public facility in which an image capture device is installed in the information processing system according to the first example embodiment of the present invention.

FIG. 6 is a schematic diagram illustrating an example of a facility database stored in the management server in the information processing system according to the first example embodiment of the present invention.

FIG. 7 is a schematic diagram illustrating an example of a reception desk database stored in the management server in the information processing system according to the first example embodiment of the present invention.

FIG. 14 is a flowchart (1) illustrating the operation of a management server in an information processing system according to a third example embodiment of the present invention.

FIG. 15 is a flowchart (2) illustrating the operation of the management server in the information processing system according to the third example embodiment of the present invention.

EXAMPLE EMBODIMENT

First Example Embodiment

An information processing system and an information processing method according to a first example embodiment of the present invention will be described with reference to FIG. 1 to FIG. 12.

Figure 1:
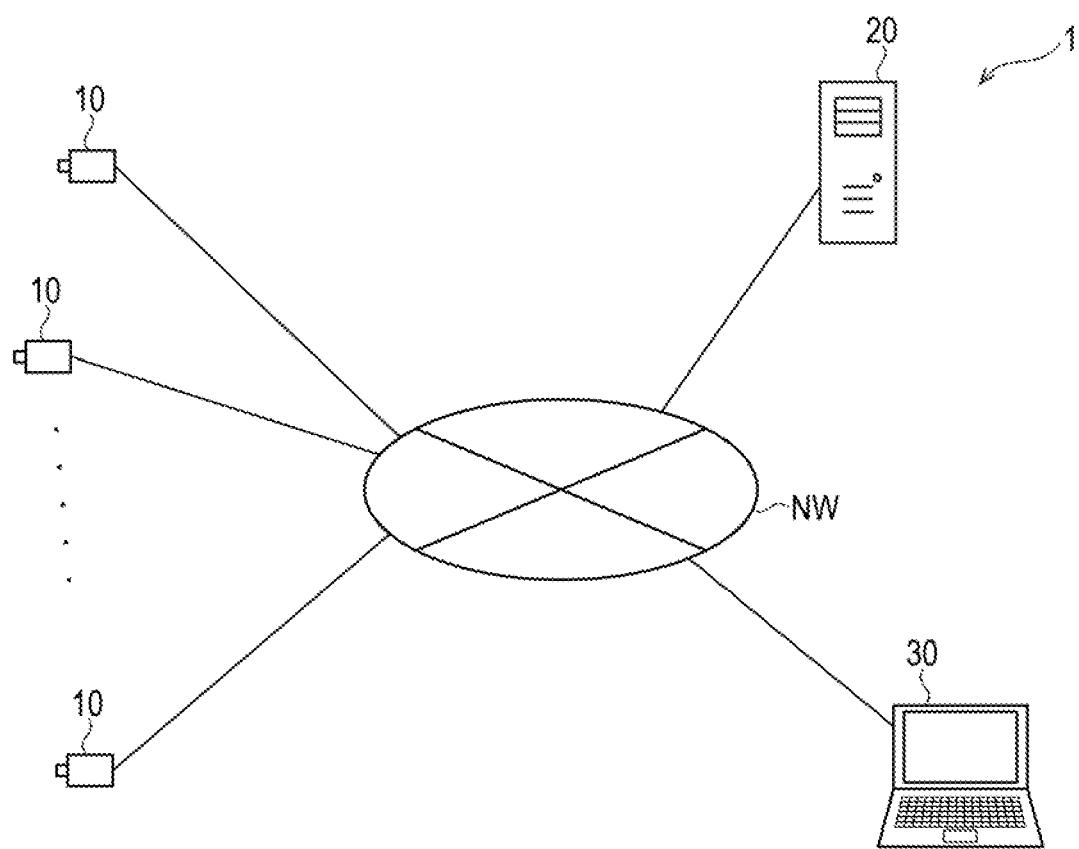
FIG. 1 is a schematic diagram illustrating the overall configuration of an information processing system according to a first example embodiment of the present invention.
Figure 2:
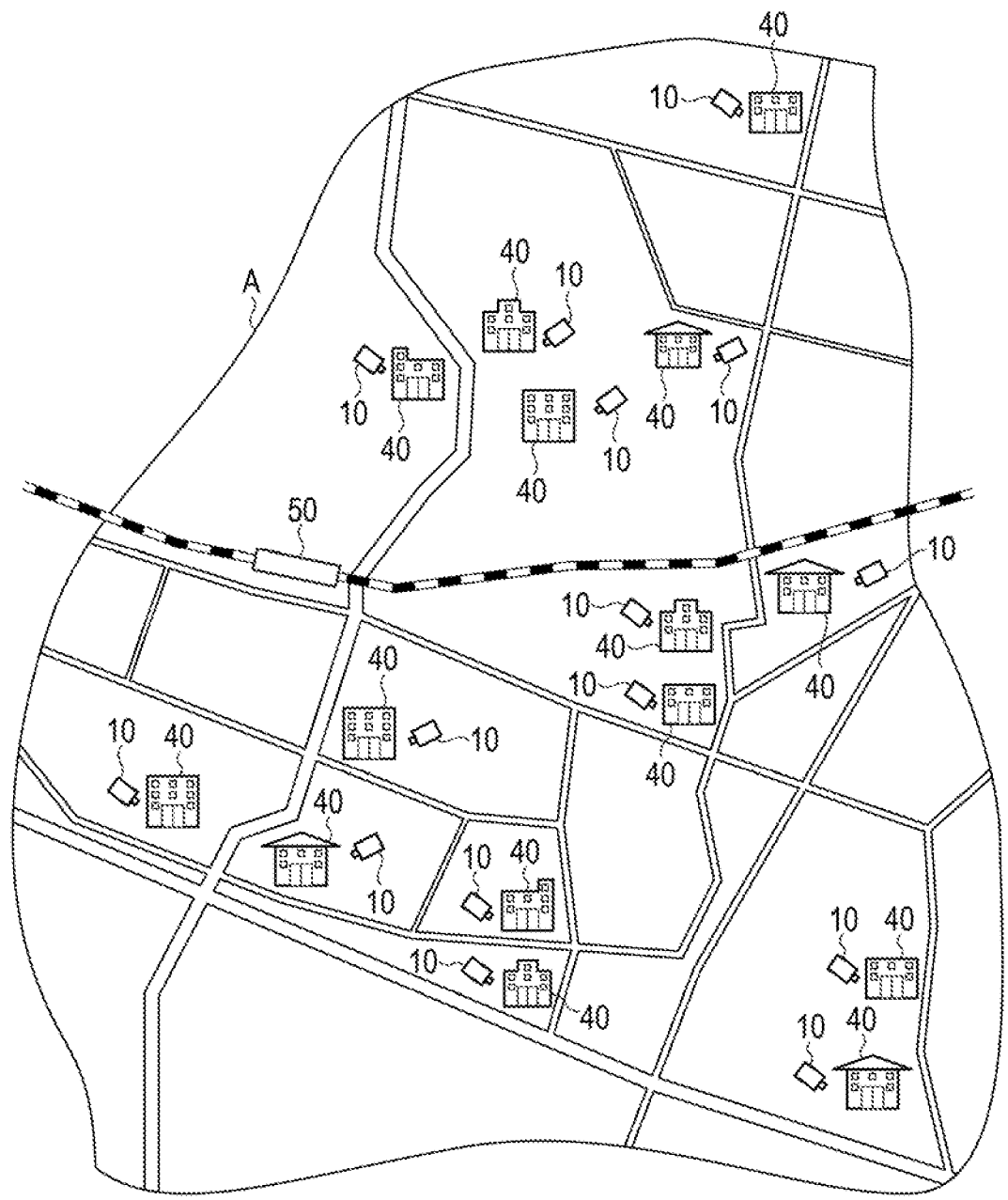
FIG. 2 is a schematic diagram illustrating an example of a distribution in an administrative district of an image capture device in the information processing system according to the first example embodiment of the present invention.

First, an overall configuration of the information processing system according to the present example embodiment will be described with reference to FIG. 1 and FIG. 2. FIG. 1 is a schematic diagram illustrating the overall configuration of the information processing system according to the present example embodiment. FIG. 2 is a schematic diagram illustrating a distribution in an administrative district of an image capture device in the information processing system according to the present example embodiment.

As illustrated in FIG. 1, an information processing system according to the present example embodiment includes a plurality of image capture devices 10, a management server 20, and an information presentation terminal 30. The plurality of image capture devices 10, the management server 20, and the information presentation terminal 30 are connected to a network NW, respectively. The network NW is formed of a wide area network (WAN), a local area network (LAN), a mobile communication network, or the like. The plurality of image capture devices 10 and the management server 20 can communicate with each other via the network NW. Further, the management server 20 and the information presentation terminal 30 can communicate with each other via the network NW. Note that the connection scheme of the plurality of image capture devices 10, the management server 20, and the information presentation terminal 30 to the network NW may be a wired scheme or a wireless scheme.

As illustrated in FIG. 2, the plurality of image capture devices 10 are installed in a plurality of public facilities 40 within a region A of a local government. One or a plurality of image capture devices 10 are installed in each public facility 40. The region A is a whole or a part of an administrative district governed by the local government. The local government is not particularly limited and may be, for example, a local public organization of administrative divisions, municipalities, a special ward, or the like.

The public facility 40 is a facility owned or managed by a local government, an affiliated organization thereof, or the like. The public facility 40 may be, for example, a government building of a government office, such as a central office, a branch office, a local office, or the like of the government office. Further, the public facility 40 may be, for example, a childcare related facility, a cultural facility, a gathering facility, a sports facility, a medical facility, a park, or the like. The childcare related facility may be, for example, a childcare support center, a children's hall, or the like. The cultural facility may be, for example, a library, a cultural center, or the like. The gathering facility may be, for example, a community center, a meeting place, or the like. The sports facility may be, for example, a gymnasium, a swimming pool, a sports center, or the like. A medical facility may be, for example, a hospital, a clinic, or the like. Note that the public facility 40 is not limited to the above example facilities and may be any public facility visited and used by a user. Note that, in the region A, other facilities such as a train station 50 are located in addition to the above public facility 40. Note that other facilities may include a facility for transportation such as a bus stop, a bus terminal, an airport, or the like, for example, in addition to the train station 50. Further, other facilities may include a commercial facility such as a shopping center, a department store, or the like, for example.

Note that the number of the provided public facilities 40 is not necessarily required to be plural in the region A, and only one public facility 40 may be provided. In such a case, the information processing system 1 is not necessarily required to include a plurality of image capture devices 10 and may include only one image capture device 10 installed in the one public facility 40. Further, the image capture device(s) 10 may be installed in one particular or some public facilities 40 of the plurality of public facilities 40.

Each image capture device 10 is installed at an entrance or the like of each public facility 40 so as to be able to capture an image of one or more visitors or the like visiting each public facility 40. The management server 20 is installed inside the facility of a local government, a business entity commissioned by the local government, or the like to which the information processing system 1 is introduced, for example. The information presentation terminal 30 is an information processing terminal used by staff engaging in an operation related to operation support performed by the information processing system 1, for example. Note that the information presentation terminal 30 may be a digital signage terminal installed in the public facility 40, a user terminal of a visitor visiting the public facility 40, or the like as described later.

The information processing system 1 according to the present example embodiment is an operation support system that performs, for example, determination of a distribution of staff, which are personnel of a local government, to a plurality of reception desks (counters) in a government building of a government office, such as a central office, a branch office, a local office, or the like of the government office out of the public facilities 40 within the region A of the local government. Note that, hereafter, a government building, such as a central office, a branch office, a local office, or the like of the government office, which is a facility having a government office function in which the staff attend visitors and provide operations of procedures, consultations, or the like at reception desks, will be simply referred to as "government office" as appropriate.

Next, each component in the information processing system 1 according to the present example embodiment will be further described with reference to FIG. 3 to FIG. 8.

First, the image capture device 10 will be described with reference to FIG. 3. FIG. 3 is a schematic diagram illustrating an example of a public facility in which the image capture devices 10 are installed. FIG. 3 illustrates the arrangement of the image capture devices 10 in a government office 42 that is a type of the public facilities 40 as an example.

As illustrated in FIG. 3, in the government office 42, a plurality of reception desks (counters) 422 are provided in association with a plurality of operations different from each other for a plurality of divisions different form each other. The plurality of reception desks 422 corresponding to a plurality of operations different from each other differ in type from each other. A plurality of divisions are not particularly limited and may be, for example, a resident affairs division, a taxation division, a welfare division, an insurance and pension division, or the like. For example, the reception desk 422 corresponding to the operation of the resident affairs division and the reception desk 422 corresponding to the operation of the taxation division differ in type from each other.

At each reception desk 422, a staff member who is a member of the local government attends a visitor and provides an operation of a procedure, a consultation, or the like in accordance with an operation associated with each reception desk 422. The number of reception desks 422 corresponding to an operation of each division may be one or plural. Note that a plurality of reception desks 422 may differ in type from each other in association with a plurality of operations different from each other in the same division.

The image capture device 10 is installed in the government office 42 in which the reception desks 422 are provided so as to be able to capture an image of visitors visiting the government office 42. The image capture device 10 is installed so as to capture an image of a space through which visitors pass, such as a space including the entrance 424 of the government office 42, for example. Further, the image capture device 10 may be installed so as to capture an image of a space where visitors stay in the government office 42, such as a lobby including the plurality of reception desks 422, a cafeteria available for visitors, or the like, for example.

Further, the image capture device 10 is installed in the government office 42 so as to be able to capture a video including transport means of visitors, such as a vehicle, a bicycle, or the like. Specifically, the image capture device 10 is installed in a parking lot 44 available for visitors of the government office 42 so as to be able to capture vehicles of visitors, such as an automobile, a motorcycle, or the like. The transport means of a visitor, such as a vehicle, a bicycle, or the like of the visitor is a related item related to the visitor, such as a property possessed by the visitor, a rent/borrowed item rent or borrowed by the visitor, or the like, for example. The image capture device 10 is installed to capture an image of a space through which vehicles moving to a parking lot 44 pass, such as a space including an entrance 442 of the parking lot 44, for example. Further, the image capture device 10 may be installed to capture an image of a space including each section of the parking lot 44. Note that the image capture device 10 may be installed in a bicycle parking lot available for visitors of the government office 42 in addition to the parking lot 44 so as to be able to capture an image of a bicycle of a visitor that is a related item of the visitor as with the vehicle. Note that, although description will be provided with a vehicle as a transport means of a visitor in the following, a bicycle may be handled in the same manner as a vehicle.

The image capture device 10 installed as described above functions as an image capture unit that captures a video including a visitor visiting the government office 42 or a vehicle that is a related item of the visitor. The image capture device 10 is a network camera that can communicate via the network NW, for example. The image capture device 10 transmits a video signal of a captured video to the management server 20 via the network NW. For example, the image capture device 10 can also transmit a video signal to the management server 20 in real time or can also transmit a video signal of a video captured in a predetermined period to the management server 20 regularly or irregularly.

Note that, also for the public facility 40 that differs in type from the government office 42, the image capture device 10 may be installed so as to be able to capture a video including a visitor visiting the public facility 40 or a transport means of the visitor in the same manner as in the case of the government office 42 described above.

Figures 4, 5:
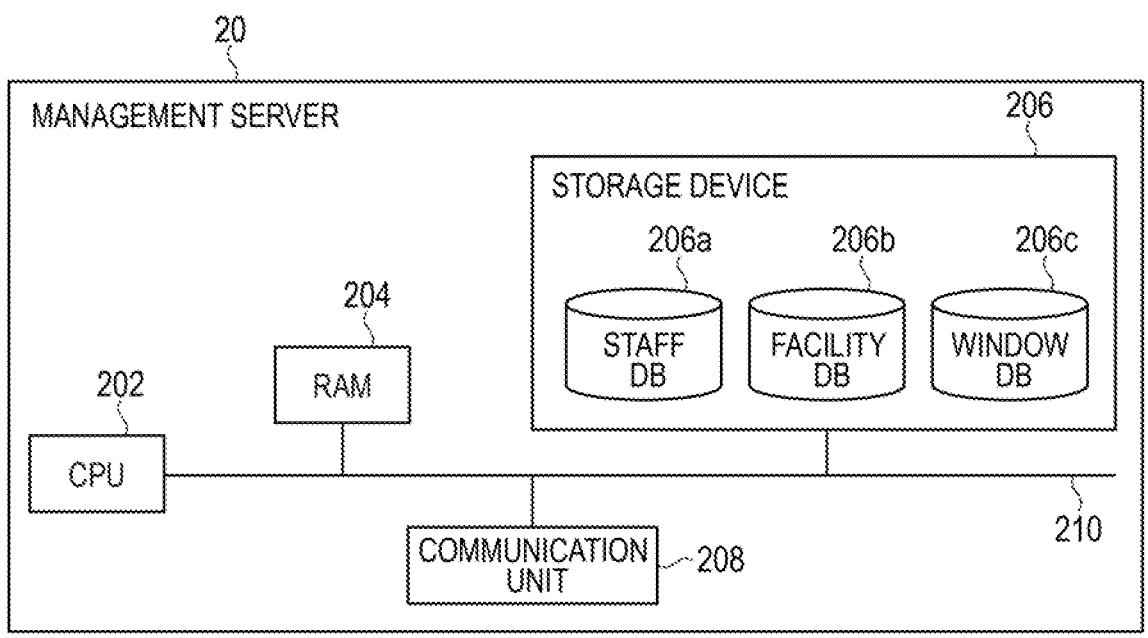
FIG. 4 is a block diagram illustrating a configuration of a management server in the information processing system according to the first example embodiment of the present invention.
FIG. 5 is a schematic diagram illustrating an example of a staff database stored in the management server in the information processing system according to the first example embodiment of the present invention.

Next, the management server 20 will be described with reference to FIG. 4 to FIG. 7. FIG. 4 is a block diagram illustrating a configuration of the management server 20. FIG. 5 is a schematic diagram illustrating an example of a staff database (DB) stored in the management server 20. FIG. 6 is a schematic diagram illustrating an example of a facility DB stored in the management server 20. FIG. 7 is a schematic diagram illustrating an example of a reception desk DB stored in the management server 20.

The management server 20 is an information processing apparatus that manages the information processing system 1 and determines a distribution of staff to the plurality of reception desks 422 or the like. Note that the function of the management server 20 may be implemented by a single server or may be implemented by a plurality of servers. Further, a part of the function of the management server 20 may be implemented by another information processing apparatus such as an edge computer installed in the public facility 40 or the like, for example. Further, for example, the image capture device 10 itself may be configured as an information processing apparatus that serves a part of the function of the management server 20.

As illustrated in FIG. 4, the management server 20 has a central processing unit (CPU) 202, a random access memory (RAM) 204, a storage device 206, and a communication unit 208. The CPU 202, the RAM 204, the storage device 206, and the communication unit 208 are connected to a bus line 210.

The CPU 202 operates by executing a program stored in the storage device 206 and functions as a control unit that controls the operation of the overall management server 20. Further, the CPU 202 executes an application program stored in the storage device 206 and performs various processes as the management server 20. The RAM 204 provides a memory area required for the operation of the CPU 202.

The storage device 206 is formed of a storage medium such as a nonvolatile memory, a hard disk drive, or the like and functions as a storage unit. The storage device 206 stores a program executed by the CPU 202, data referenced by the CPU 202 when the program is executed, or the like.

Further, the storage device 206 stores a staff DB 206a, a facility DB 206b, and a reception desk DB 206c. The staff DB 206a, the facility DB 206b, and the reception desk DB 206c may be databases separated from each other or may be a database aggregated with each other.

The staff DB 206a is a database in which staff information that is information related to staff in charge of reception desk operations of the government office 42 is registered. In the staff DB 206a, staff information including staff Identification (ID), names, departments, staff-stationed facilities, suitable operations, or the like is registered as illustrated in FIG. 5, for example. The staff ID is an identifier that uniquely identifies a staff member. The name and the department are examples of management information related to a staff member. As the management information, a position, a contact address, or the like may be registered, for example. The staff-stationed facility is the government office 42 where staff are stationed and, for example, is identified by the facility ID of the government office 42 where the staff are stationed. The suitable operation is an operation which a staff member may be in charge of and for which the staff member has aptitude. Various pieces of information such as staff ID, names, departments, staff-stationed facilities, suitable operations, or the like included in the staff information are registered in association with each other.

The facility DB 206*b* is a database in which facility information that is information related to the public facilities including the government office 42 is registered. In the facility DB 206*b*, facility information including facility ID, names, types, location information, reception desks, or the like is registered as illustrated in FIG. 6, for example. The facility ID is an identifier that uniquely identifies the public facility 40. The name is the name of the public facility 40. The type is a type such as a childcare related facility, a cultural facility, a gathering facility, a sports facility, a medical facility, a park, or the like that classifies the public facilities 40. The location information is information including information indicating the location of the address where the public facility 40 is located, information indicating a distance relationship to another facility such as another public facility 40, the train station 50, or the like, or the like, for example. The reception desk is the reception desk 422 provided in the government office 42 and is identified by reception desk ID of the reception desk 422, for example. Various pieces of information such as facility ID, names, addresses, reception desks, or the like included in the facility information are registered in association with each other.

The reception desk DB 206*c* is a database in which reception desk information that is information related to the plurality of reception desks 422 provided in the plurality of government offices 42 is registered. In the reception desk DB 206*c*, reception desk information including reception desk ID, types, reception desk-provided facilities, staff in charge, or the like is registered as illustrated in FIG. 7, for example. The reception desk ID is an identifier that uniquely identifies the reception desk 422. The type is a type in accordance with a corresponding operation of the reception desk 422. The reception desk-provided facility is the government office 42 where the reception desk 422 is provided and, for example, is identified by the facility ID of the government office 42. The staff in charge is a staff member who is assigned to the reception desk 422 and in charge of the reception desk 422 and, for example, is identified by the staff ID of a staff member.

The communication unit 208 is connected to the network NW and transmits and receives data via the network NW. The communication unit 208 communicates with the image capture device 10 and with the information presentation terminal 30 under the control of the CPU 202.

The management server 20 is configured in such a way.

Figure 8:
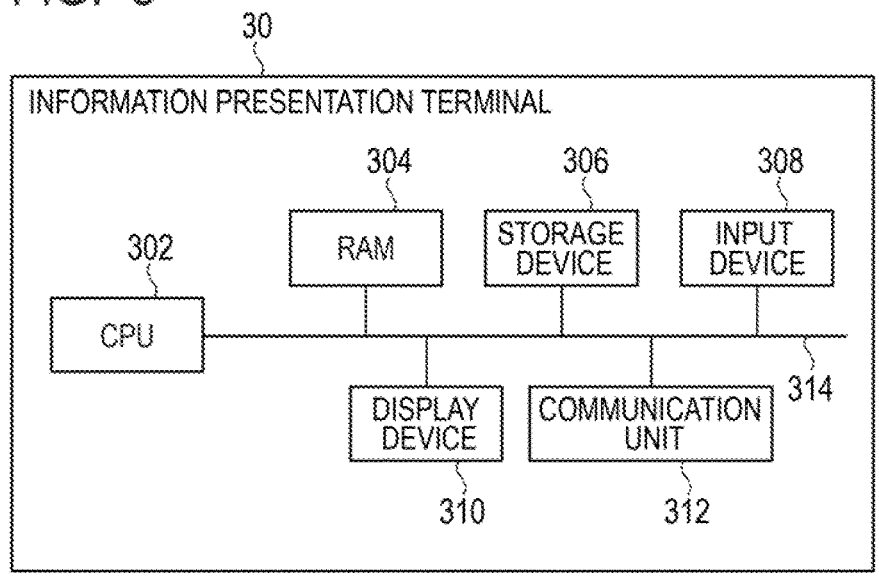
FIG. 8 is a block diagram illustrating a configuration of an information presentation terminal in the information processing system according to the first example embodiment of the present invention.

Next, the information presentation terminal 30 will be described with reference to FIG. 8. FIG. 8 is a block diagram illustrating a configuration of the information presentation terminal 30.

The information presentation terminal 30 is a manager terminal that presents, to a staff member in charge who is authorized for a distribution of staff, a distribution of staff to the reception desks 422 determined by the management server 20 based on a demand level of the reception desk 422, for example.

Note that the information presentation terminal 30 may be a digital signage terminal installed in the government office 42 or a user terminal of a visitor visiting the government office 42. The digital signage terminal is a guidance terminal for visitors that is installed in an entrance lobby or the like in order to provide various information to visitors visiting the government office 42, for example. The user terminal is a mobile terminal such as a smartphone, a tablet terminal, or the like, for example. In such a case, the information presentation terminal 30 can present a demand level of the reception desk 422 or a congestion level of the reception desk 422 based on the demand level instead of the distribution of staff.

As illustrated in FIG. 8, the information presentation terminal 30 has a CPU 302, a RAM 304, a storage device 306, an input device 308, a display device 310, and a communication unit 312. The CPU 302, the RAM 304, the storage device 306, the input device 308, the display device 310, and the communication unit 312 are connected to a bus line 314.

The CPU 302 operates by executing a program stored in the storage device 306 and functions as a control unit that controls the operation of the overall information presentation terminal 30. Further, the CPU 302 executes an application program stored in the storage device 306 and performs various processes as the information presentation terminal 30. The RAM 304 provides a memory area required for the operation of the CPU 302.

The storage device 306 is formed of a storage medium such as a nonvolatile memory, a hard disk drive, or the like and functions as a storage unit. The storage device 306 stores a program executed by the CPU 302, data referenced by the CPU 302 when the program is executed, or the like.

The input device 308 functions as an input unit that accepts input from an operator such as a staff member. The input device 308 is a keyboard, a touch panel embedded in the display device 310, or the like, for example.

The display device 310 functions as a display unit that displays various screens to a reader such as a staff member. The display device 310 displays various screens under the control of the CPU 302.

The communication unit 312 is connected to the network NW and transmits and receives data via the network NW. The communication unit 312 communicates with the management server 20 under the control of the CPU 302.

The information presentation terminal 30 is configured in such a way.

Figure 9:
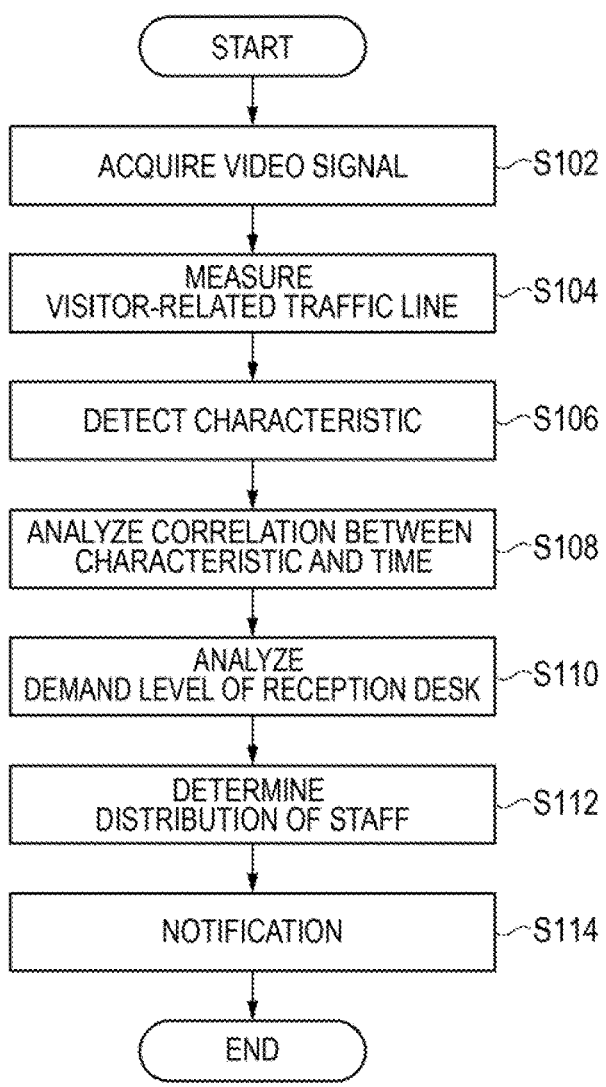
FIG. 9 is a flowchart illustrating the operation of the management server in the information processing system according to the first example embodiment of the present invention.
Figure 10:
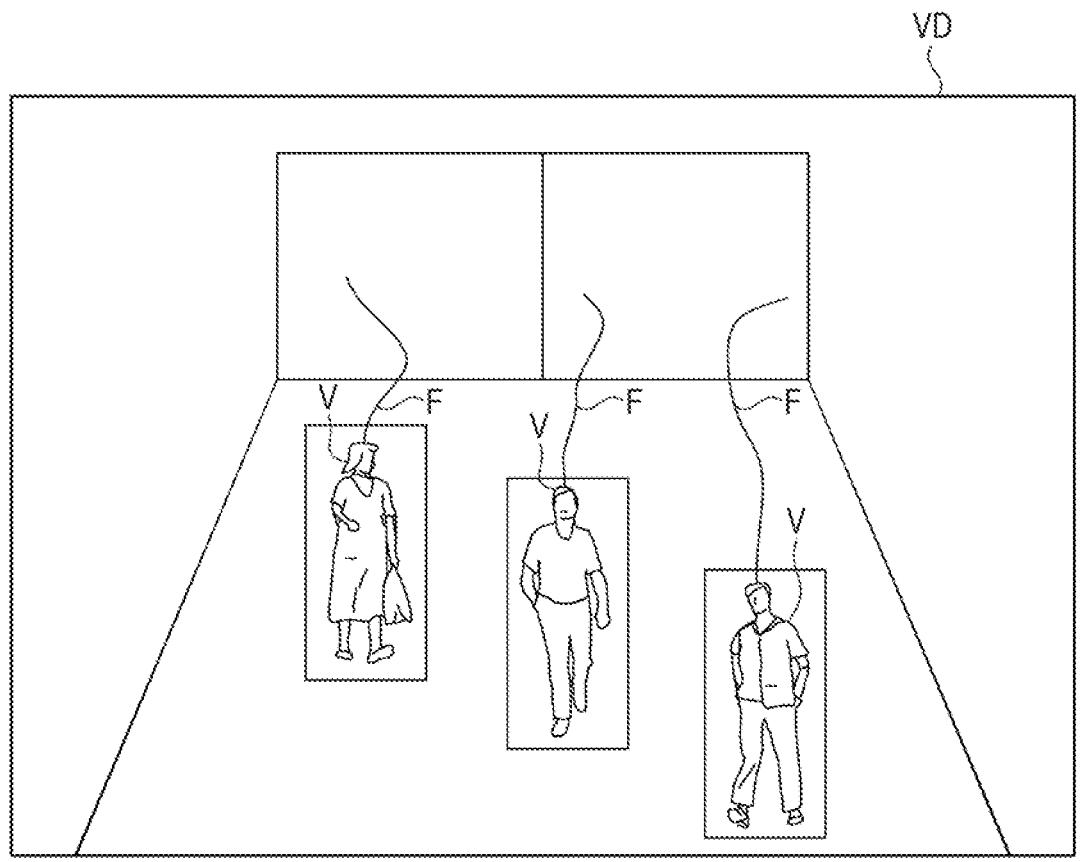
FIG. 10 is a schematic diagram illustrating measurement of traffic lines and detection of a characteristic performed by the management server in the information processing system according to the first example embodiment of the present invention.
Figure 11:
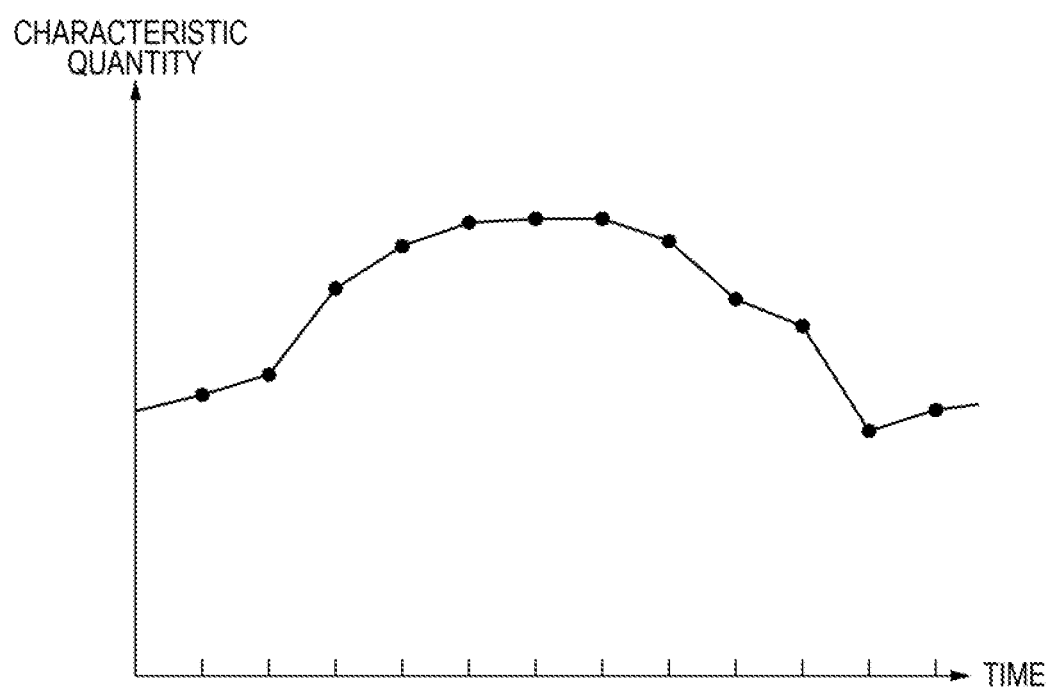
FIG. 11 is a schematic diagram illustrating an example of a correlation between characteristics and time in the information processing system according to the first example embodiment of the present invention.

The operation of each component in the information processing system 1 according to the present example embodiment will be further described below with reference to FIG. 9 to FIG. 11. FIG. 9 is a flowchart illustrating the operation of the management server 20. FIG. 10 is a schematic diagram illustrating measurement of traffic lines and detection of a characteristic performed by the management server 20. FIG. 11 is a schematic diagram illustrating an example of a correlation between characteristics and time. When each component operates, the information processing method of the present example embodiment is performed.

In the present example embodiment, a case of determining a distribution of staff to a plurality of different types of reception desks 422 in one particular government office 42 will be described. Note that, in the second example embodiment described later, a case of determining a distribution of staff to a plurality of different types of reception desks 422 in a cross-sectional manner over a plurality of government offices 42 will be described.

The image capture device 10 installed in the government office 42 captures an image of a space through which visitors visiting the government office 42 pass and captures a video including visitors. Further, the image capture device 10 installed in the parking lot 44 available for visitors captures an image of a space through which vehicles moving toward the parking lot 44 of the government office 42 pass and captures a video including vehicles of visitors. Each of the image capture devices 10 transmits a video signal of each captured video to the management server 20 via the network NW. Note that the image capture device 10 may be installed to capture a video including at least one of a visitor and a vehicle thereof visiting the government office 42.

As illustrated in FIG. 9, the CPU 202 of the management server 20 functions as a receiving unit and receives and acquires a video signal transmitted from the image capture device 10 (step S102).

Next, the CPU 202 functions as a measurement unit and measures visitor-related traffic lines that are traffic lines related to visitors visiting the government office 42 based on a video of the acquired video signal (step S104). Specifically, the CPU 202 detects visitors in a video including the visitors captured by the image capture device 10 installed in the government office 42, acquires position information on the visitors in a time series manner, and measures traffic lines of the visitors, that is, flows of people that are visitor-related traffic lines. The traffic lines of visitors are made of time-series position information on the visitors. Further, the CPU 202 detects vehicles in a video including the vehicles captured by the image capture device 10 installed in the parking lot 44, acquires position information on the vehicle in a time series manner, and measures traffic lines of the vehicles that are visitor-related traffic lines. The traffic lines of vehicles are made of time-series position information on the vehicles.

For example, as illustrated in FIG. 10, in a case of a video VD including visitors V, the CPU 202 detects one or a plurality of visitors V in the video VD and acquires the position information on the visitors V in a time series manner. Accordingly, the CPU 202 measures flows of people F that are traffic lines made of the time-series position information on the visitors V.

Further, the CPU 202 functions as a detection unit and detects and acquires a characteristic of a visitor or a vehicle whose traffic line has been measured (step S106). The characteristic of a visitor is, for example, an age, a sexuality, a moving speed, the presence of absence of baggage, the amount of baggage, appearance, or the like. The characteristic of a vehicle is, for example, a manufacturer, a model, a body color, or the like. The CPU 202 can detect a characteristic of a visitor and a vehicle by using an image analysis technology such as attribute estimation. Note that the CPU 202 may be required to acquire at least any one of the plurality of characteristics as illustrated as examples.

Next, the CPU 202 functions as an analysis unit and analyzes a correlation between the detected characteristic and time such as a time of day, a time zone, or the like to acquire correlation information indicating the correlation between the characteristic and the time (step S108). Herein, the time is a time of day, a time zone, or the like, for example. That is, the CPU 202 analyzes a correlation between the characteristic of a visitor and the time. Further, the CPU 202 analyzes a correlation between the characteristic of a vehicle of a visitor and the time. The CPU 202 can analyze a correlation on a characteristic basis or a combination of characteristics basis, for example. Further, the CPU 202 can analyze a correlation between the characteristic and the time in a predetermined period up to the current time.

For example, as a correlation between a focused characteristic and time, the CPU 202 can analyze variation of a characteristic quantity, which is the number of visitors or vehicles having the characteristic of interest, with respect to time, as illustrated in FIG. 11.

In such a way, the CPU 202 acquires correlation information indicating a correlation between a characteristic of a visitor and time based on a traffic line of the visitor and acquires correlation information indicating a correlation between a characteristic of a vehicle and time based on a traffic line of the vehicle. Note that the CPU 202 may be required to acquire at least one of the correlation information indicating the correlation between a characteristic of a visitor and time and the correlation information indicating the correlation between a characteristic of a vehicle and time.

Next, the CPU 202 functions as an analysis unit and analyzes and estimates respective demand levels of different types of the reception desks 422 based on the correlation information acquired for each characteristic (step S110). The demand level of the reception desk 422 indicates how high the demand is in accordance with the number of visitors who wishes to use the reception desk 422. The CPU 202 analyzes the demand level based on correlation information indicating a correlation between a characteristic of a visitor and time for each of the different types of the reception desks 422. Further, CPU 202 analyzes the demand level based on correlation information indicating a correlation between a characteristic of a vehicle and time for each of the different types of the reception desks 422. In the analysis of a demand level, the CPU 202 may analyze a demand level based on both of or any one of the correlation information indicating the correlation between a characteristic of a visitor and time and the correlation information indicating the correlation between a characteristic of a vehicle and time. Since there is some relation between a characteristic of a visitor or a characteristic of a vehicle, which is a related item of the visitor, and a type of the reception desk 422 used by the visitor, a demand level can be estimated based on correlation information related to a characteristic.

The CPU 202 can estimate a demand level by using an appropriate scheme. For example, the CPU 202 can estimate a demand level by using a trained model that has been trained by machine learning so as to output a demand level for input of correlation information. The trained model is a model trained by machine learning by using training data in which correlation information is the input data and a demand level is the output data, for example. Further, the CPU 202 can estimate a demand level by using a function or the like that outputs a demand level from correlation information as a variable, for example. The function is a function designed in accordance with regression analysis or the like, for example. The trained model, the function, or the like used in estimation of a demand level may be stored in advance in the storage device 206, for example, so as to be available for the CPU 202.

The CPU 202 may estimate, as a demand level, the current demand level in real time or may estimate a future demand level at the time after a predetermined period elapses from the current time. The period after a predetermined period elapses is not particularly limited and may be a period on a second basis, a minute basis, an hour basis, a day basis, a week basis, or a year basis.

Further, the CPU 202 can analyze a demand level taking into consideration of influence due to a factor such as an event, weather, a season, a day of the week, or the like, for example.

Next, the CPU 202 functions as a determination unit and determines a distribution of staff to each reception desk 422 in accordance with the demand level estimated for different types of the reception desks 422 (step S112). Specifically, the CPU 202 can determine a distribution of staff so as to distribute more staff to the reception desk 422 of a higher demand level out of the plurality of reception desks 422 and distribute less staff to the reception desk 422 of a lower demand level, for example. In the determination of a distribution of staff, the CPU 202 can reference the staff DB 206a and the reception desk DB 206c.

In the determination of a distribution of staff, the CPU 202 can reference the staff DB 206a and, from staff stationed at the government office 42 where the distribution of staff is to be determined, determine a distribution of staff for the government office 42 where a distribution of staff is to be determined. Further, the CPU 202 can also reference the staff DB 206a and, from staff stationed at the government office 42 where the distribution of staff is to be determined and staff stationed at another one or a plurality of government offices 42, determine a distribution of staff for the government office 42 where a distribution of staff is to be determined. In the latter case, the CPU 202 can reference the facility DB 206b and take into consideration of a travel distance in which a staff member travels between the government offices 42 to determine a distribution of staff. For example, the CPU 202 can determine a distribution of staff under a condition that the travel distance in which the staff member travels between the government offices is required to be less than or equal to a predetermined threshold.

Further, in the determination of a distribution of staff, the CPU 202 can reference the staff DB 206a and take into consideration of aptitude of a staff member including a suitable operation for the staff member to determine a distribution of staff. For example, the CPU 202 can determine a distribution of staff under a condition that a staff member can be assigned to only the reception desk 422 corresponding to an operation that matches a suitable operation for the staff member.

The CPU 202 can determine a distribution of staff as described above by using a rule-based determination engine, a determination engine using a trained model trained by machine learning, or the like, for example.

As described above, in the present example embodiment, a demand level is estimated based on correlation information between a characteristic and time, and staff to be distributed to a plurality of different types of reception desks 422 is determined based on the estimated demand level. Thus, according to the present example embodiment, in the government office 42 run by public funds and thus expected for an appropriate distribution of staff, it is possible to realize a more appropriate distribution of staff and thus the optimal distribution of staff to a plurality of different types of reception desks 422.

Next, the CPU 202 functions as a notification unit and transmits staff distribution information, which is information indicating a distribution of staff determined in accordance with a demand level, to the information presentation terminal 30 via the network NW to notify the information presentation terminal 30 of the staff distribution information (step S114). At this time, the CPU 202 can also transmit demand level information indicating a demand level of the plurality of reception desks 422 to the information presentation terminal 30 via the network NW to notify the information presentation terminal 30 of the demand level information in addition to or instead of the staff distribution information.

In response to receiving and acquiring the staff distribution information from the management server 20, the CPU 302 of the information presentation terminal 30 functions as presentation unit as described below and displays, on the display device 310, and presents information to a staff member in charge or a visitor.

When the information presentation terminal 30 is a manager terminal, the CPU 302 displays, on the display device 310, the distribution of staff to the reception desk 422 indicated by the staff distribution information to present the distribution to the staff in charge. Further, the CPU 302 can also display, on the display device 310, the demand level of the reception desk 422 indicated by the demand level information received in addition to or instead of the staff distribution information to present the demand level to the staff in charge. In response to presentation on the information presentation terminal 30, a staff member in charge may take various actions. For example, as the action, the staff member in charge may change the distribution of staff to the reception desk 422 in accordance with the presented distribution of staff in real time or may schedule a change of the distribution of staff. Further, as the action, the staff member in charge may use the presented distribution of staff as a material in determining a distribution of staff in the future, for example.

When the information presentation terminal 30 is a digital signage terminal or a user terminal, the CPU 302 can display, on the display device 310, the demand level of the reception desk 422 indicated by the demand level information received in addition to or instead of the staff distribution information to present the demand level to a visitor. Further, the CPU 302 can display, on the display device 310, and present a congestion level of the reception desk 422 based on the demand level of the reception desk 422 to a visitor. The CPU 302 can calculate a waiting time, the number of waiting persons, or the like for the reception desk 422 as a congestion level of the reception desk 422 based on the demand level of the reception desk 422 and display the congestion level on the display device 310. Accordingly, the CPU 302 can present the demand level of the reception desk 422 or the congestion level of the reception desk 422 to a visitor visiting the government office 42.

As described above, according to the present example embodiment, since staff to be distributed to a plurality of different types of reception desks 422 are determined based on a demand level estimated based on correlation information between a characteristic and time, a more appropriate distribution of staff and thus the optimal distribution of staff can be realized.

Second Example Embodiment

An information processing system and an information processing method according to a second example embodiment of the present invention will be described with reference to FIG. 12 and FIG. 13. Note that the same components as those in the information processing system and the information processing method according to the first example embodiment described above are labeled with the same references, and the description thereof will be omitted or simplified.

Although the case where a distribution of staff to the reception desks 422 is determined for one particular government office 42 has been described in the above first example embodiment, the case is not limited thereto. The information processing system 1 can determine a distribution of staff to the reception desks 422 for at least one government office 42. That is, the information processing system 1 can also determine a distribution of staff to the reception desks 422 across a plurality of government offices 42 including the central office, a branch office, a local office, or the like in a cross-sectional manner.

In the present example embodiment, the operation of each component in the information processing system 1 when determining a distribution of staff to the reception desks 422 across the plurality of government offices 42 in a cross-sectional manner will be described with reference to FIG. 12 and FIG. 13. FIG. 12 and FIG. 13 are flowcharts illustrating the operation of the management server 20 in the information processing system 1 according to the present example embodiment. Note that the configuration of the information processing system 1 according to the present example embodiment is the same as that in the case of the first example embodiment. When each component operates, the information processing method of the present example embodiment is performed.

Figure 12:
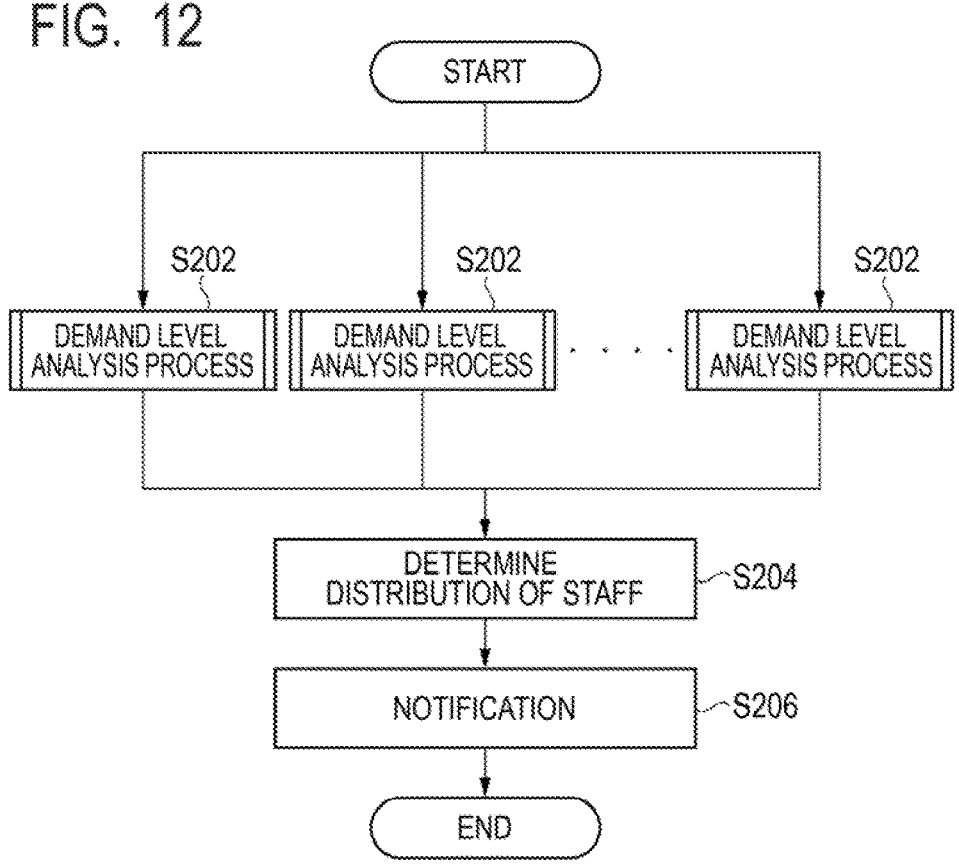
FIG. 12 is a flowchart (1) illustrating the operation of a management server in an information processing system according to a second example embodiment of the present invention.

As illustrated in FIG. 12, the CPU 202 of the management server 20 performs a demand level analysis process for each of the plurality of government offices 42 where a distribution of staff to the reception desks 422 is to be determined (step S202). Note that the plurality of government offices 42 where a distribution of staff to the reception desks 422 is to be determined may be all or some of the plurality of government offices 42 within the region A.

Figure 13:
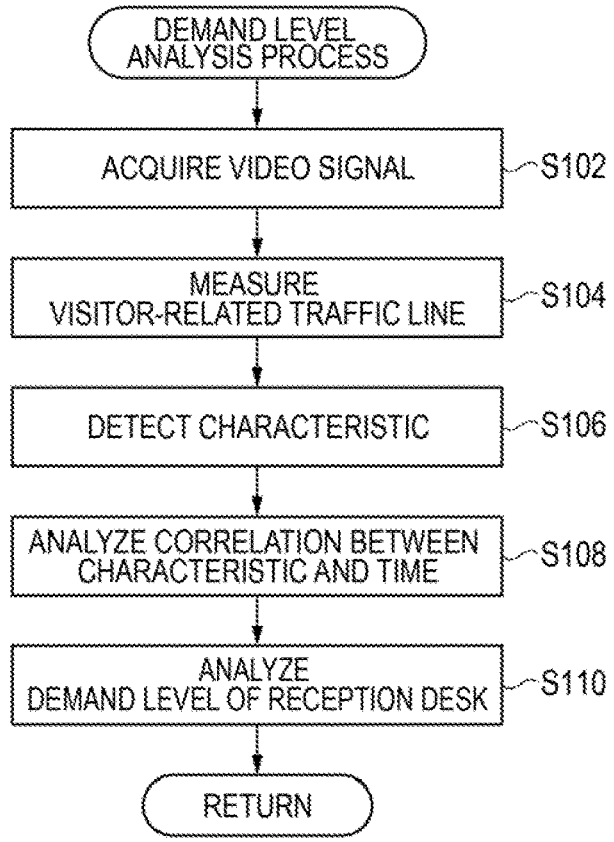
FIG. 13 is a flowchart (2) illustrating the operation of the management server in the information processing system according to the second example embodiment of the present invention.

In the demand level analysis process performed for each government office 42, the CPU 202 performs each step from step S102 to step S110 in the same manner as in the first example embodiment as illustrated in FIG. 13. Note that the CPU 202 may perform demand level analysis processes for a plurality of government offices 42 in parallel or may perform demand level analysis processes sequentially for a plurality of government offices 42.

Next, as illustrated in FIG. 12, the CPU 202 functions as a determination unit and determines a distribution of staff to respective reception desks 422 in the plurality of government offices 42 in accordance with the demand level estimated for the plurality of different types of reception desks 422 in the plurality of government offices 42 (step S204). Specifically, out of the plurality of different types of reception desks 422 in the plurality of government offices 42, the CPU 202 determines a distribution of staff so as to distribute more staff to the reception desk 422 of a higher demand level and distribute less staff to the reception desk 422 of a lower demand level, for example. In the determination of a distribution of staff, the CPU 202 can reference the staff DB 206a and the reception desk DB 206c.

In the determination of a distribution of staff, the CPU 202 may reference the staff DB 206a and, from staff stationed at the plurality of government offices 42 where the distribution of staff is to be determined, determine a distribution of staff for the plurality of government offices 42 where a distribution of staff is to be determined. The CPU 202 can reference the facility DB 206b and take into consideration of a travel distance in which a staff member travels between the government offices 42 to determine a distribution of staff. For example, the CPU 202 can determine a distribution of staff under a condition that the travel distance in which a staff member travels between the government offices 42 is required to be less than or equal to a predetermined threshold.

Further, in the determination of a distribution of staff, the CPU 202 can reference the staff DB 206a and take into consideration of a suitable operation for a staff member to determine a distribution of staff in the same manner as in the case of the first example embodiment.

Next, the CPU 202 functions as a notification unit, transmits staff distribution information indicating a distribution of staff to the information presentation terminal 30 via the network NW, and notifies the information presentation terminal 30 of the staff distribution information in the same manner as in the first example embodiment (step S206). At this time, the CPU 202 can also transmit demand level information indicating demand levels of a plurality of reception desks 422 to provide a notification in the same manner as in the first example embodiment.

In response to receiving and acquiring the staff distribution information from the management server 20, the CPU 302 of the information presentation terminal 30 functions as a presentation unit as described below and displays, on the display device 310, and presents information to a staff member in charge or a visitor.

When the information presentation terminal 30 is a manager terminal, the CPU 302 of the information presentation terminal 30 displays, on the display device 310, the distribution of staff to the reception desk 422 indicated by the staff distribution information to present the distribution to the staff in charge in the same manner as in the first example embodiment. Further, the CPU 302 can also display, on the display device 310, and present the demand level of the reception desk 422 to the staff member in charge in the same manner as in the first example embodiment. In response to presentation of the distribution of staff on the information presentation terminal 30, a staff member in charge may take various actions in the same manner as in the first example embodiment.

Further, when the information presentation terminal 30 is a digital signage terminal or a user terminal, the CPU 302 can display, on the display device 310, the demand level indicated by the demand level information in the same manner as in the first example embodiment. Further, the CPU 302 can display the congestion level of the reception desk 422 based on the demand level of the reception desk 422 on the display device 310 in the same manner as in the first example embodiment.

As with the present example embodiment, it is also possible to determine a distribution of staff to a plurality of different types of reception desks 422 in a plurality of government offices across a plurality of government offices 42 in a cross-sectional manner. Also in such a case, since staff to be distributed to a plurality of different types of reception desks 422 are determined based on a demand level estimated based on correlation information between a characteristic and time, a more appropriate distribution of staff and thus the optimal distribution of staff can be realized.

Third Example Embodiment

An information processing system and an information processing method according to a third example embodiment of the present invention will be described with reference to FIG. 14 and FIG. 15. Note that the same components as those in the information processing system and the information processing method according to the first and second example embodiments described above are labeled with the same references, and the description thereof will be omitted or simplified.

Although the case where a distribution of staff to the plurality of reception desks 422 is determined for one or a plurality of government offices 42 has been described in the above first and second example embodiments, the case is not limited thereto. The information processing system 1 can also determine arrangement or working time of the public facility 40 based on the congestion level of the public facility 40.

In the present example embodiment, the operation of each component in the information processing system 1 when arrangement or working time of the public facility 40 is determined based on the congestion level of the public facility 40 will be described with reference to FIG. 14 and FIG. 15. FIG. 14 and FIG. 15 are flowcharts illustrating the operation of the management server 20 in the information processing system 1 according to the present example embodiment. Note that the configuration of the information processing system 1 according to the present example embodiment is the same as that in the case of the first example embodiment. When each component operates, the information processing method of the present example embodiment is performed.

The public facility 40 whose arrangement or working time is to be determined may be all or some of a plurality of public facilities 40 within the region A or may be one particular public facility 40. Note that determining arrangement of the public facility 40 may be, for example, determining maintenance or abolition of the public facility 40, determining downsizing or expansion of the public facility 40, determining relocation of the public facility 40, determining aggregation of the public facilities 40, or the like. Further, determining working time of the public facility 40 may be, for example, determining reduction or extension of working time per day, determining reduction or increase of working days per a predetermined period such as a month, a year, or the like, or the like. Note that, although a case of determining arrangement or working time of the public facility 40 will be described in the present example embodiment, both arrangement and working time of the public facility 40 can be determined.

The image capture device 10 installed in the public facility 40 captures an image of a space through which visitors visiting the public facility 40 pass and captures a video including visitors in the same manner as in the case of the government office 42 of the first example embodiment. Further, the image capture device 10 installed in the public facility 40 captures an image of a space through which vehicles moving toward a parking lot of the public facility 40 pass and captures a video including vehicles of visitors in the same manner as in the case of the government office 42 of the first example embodiment. Each of the image capture devices 10 transmits a video signal of each captured video to the management server 20 via the network NW. Note that the image capture device 10 may be installed to capture a video including at least one of a visitor and a vehicle thereof visiting the public facility 40.

As illustrated in FIG. 14, the CPU 202 of the management server 20 performs a congestion level estimation process for one or a plurality of public facilities 40 whose arrangement or working time is to be determined (step S302). Note that the CPU 202 may perform the congestion level estimation processes for a plurality of public facilities 40 in parallel or may perform congestion level estimation processes sequentially for a plurality of public facilities 40.

In the congestion level estimation process performed for each public facility 40, as illustrated in FIG. 15, the CPU 202 functions as a receiving unit and receives and acquires a video signal transmitted from the image capture device 10 in the same manner as in the case of the government office 42 of the first example embodiment (step S3022).

Next, the CPU 202 functions as a measurement unit and measures visitor-related traffic lines in the same manner as in the case of the government office 42 of the first example embodiment based on a video from the acquired video signal (step S3024). Specifically, the CPU 202 detects visitors in the video including the visitors captured by the image capture device 10 installed in the public facility 40 to acquire position information on the visitors in a time series manner and measures traffic lines of the visitors, that is, flows of people that are visitor-related traffic lines. Further, the CPU 202 detects vehicles in the video including the vehicles captured by the image capture device 10 installed in the parking lot of the public facility 40 to acquire position information on the vehicles in a time series manner and measures traffic lines of the vehicles that are visitor-related traffic lines. Note that the CPU 202 may be required to measure at least one of a traffic line of a visitor and a traffic line of a vehicle.

Next, the CPU 202 functions as an acquisition unit and estimates and acquires a congestion level of the public facility 40 from traffic lines of visitors or traffic lines of vehicles (step S3026). The congestion level of the public facility 40 indicates a degree of congestion of visitors visiting the public facility 40 of interest. The CPU 202 can indicate the number of visitors visiting the public facility 40 per unit time or the like, for example, as the congestion level. The CPU 202 can count the number of visitors or the number of vehicles per unit time from traffic lines of visitors or traffic lines of vehicles and estimate a congestion level based on the counted number of visitors or the counted number of vehicles. The CPU 202 can estimate a congestion level per time such as a continuous time, a time zone, or the like, for example. The time zone in which a congestion level is estimated is not particularly limited and may be a time zone on a second basis, a minute basis, an hour basis, a day basis, a week basis, or a year basis. Note that the CPU 202 can also count the number of visitors and the number of vehicles per unit time from a traffic line of visitors and a traffic line of vehicles and estimate a congestion level based on both the counted number of visitors and the counted number of vehicles.

Note that, although the case of estimating and acquiring a congestion level based on a traffic line measured from a video captured by the image capture device 10 has been described in the present example embodiment, the case is not limited thereto. The CPU 202 can estimate and acquire a congestion level based on position information transmitted from a mobile terminal carried by a visitor visiting the public facility 40, for example. The position information transmitted from a mobile terminal may be information obtained by using Global Navigation Satellite System (GNSS) such as Global Positioning System (GPS), for example. Further, the CPU 202 can estimate and acquire a congestion level based on the number of visitors detected by a human sensor such as an infrared sensor, for example. Further, the CPU 202 can estimate and acquire a congestion level based on position information obtained by using a beacon signal received by a mobile terminal carried by a visitor visiting the public facility 40, for example.

Next, the CPU 202 associates the estimated congestion level, the time when the congestion level is estimated, the time such as a time zone, and a characteristic of the public facility 40 with each other and generates facility congestion information (step S3028). The facility congestion information is information including the congestion level, the time, and the characteristic of the public facility 40 associated with each other. In the association, these congestion level, time, and characteristic may be correlated with each other. The characteristic of the public facility 40 includes a type of the public facility 40, location information on the public facility 40, or the like, for example. The CPU 202 can reference the facility DB 206b and acquire the characteristic of the public facility 40, such as the type of the public facility 40, the location information on the public facility 40, or the like. The location information on the public facility 40 is information including information indicating a location of the address where the public facility 40 is located, information indicating a distance relationship to another facility such as another public facility 40, the train station 50, or the like, or the like, for example.

Next, as illustrated in FIG. 14, the CPU 202 functions as a determination unit and determines arrangement or working time of each public facility 40 based on the facility congestion information generated as described above for each public facility 40 whose arrangement and working time is to be determined (step S304). In the determination of arrangement of each public facility 40, the CPU 202 can determine maintenance or abolition of the public facility 40, downsizing or expansion of the public facility 40, relocation of the public facility 40, aggregation of the public facilities 40, or the like, for example. For example, when the same type of two public facilities 40 are provided in a distance less than or equal to a predetermined threshold, the CPU 202 can determine arrangement or working time of the public facility 40 so as to determine abolition or reduction of working time for one of the public facilities 40 having a lower congestion level. Further, in the determination of working time of the public facility 40, the CPU 202 can determine reduction or extension of working time per day, reduction or increase of working days per a predetermined period, or the like, for example.

The CPU 202 can determine arrangement or working time of each public facility 40 by using a rule-based determination engine, a determination engine using a trained model trained by machine learning, or the like, for example.

Next, the CPU 202 functions as a notification unit and transmits facility management information, which is information indicating arrangement or working time of each public facility 40 determined based on facility congestion information, to the information presentation terminal 30 via the network NW to notify the information presentation terminal 30 of the facility management information (step S306). At this time, the CPU 202 can also transmit the facility congestion information including a congestion level, time, and a characteristic of the public facility 40 to the information presentation terminal 30 via the network NW and notify the information presentation terminal 30 of the facility congestion information in addition to or instead of the facility management information.

In response to receiving and acquiring the facility management information from the management server 20, the CPU 302 of the information presentation terminal 30 functions as a presentation unit as described below and displays, on the display device 310, and presents information to a staff member in charge or a visitor.

When the information presentation terminal 30 is a manager terminal, the CPU 302 displays, on the display device 310, and presents arrangement or working time of the public facility 40 indicated by the facility management information to a staff member in charge. Further, the CPU 302 can also display, on the display device 310, and present the congestion level of the public facility 40 included in the facility congestion information received in addition to or instead of the facility management information to a staff member in charge. In response to presentation on the information presentation terminal 30, the staff member in charge may take various actions. For example, the staff member in charge may use the presented arrangement or working time of the public facility 40 as a material in determining arrangement or working time of the public facility 40 in the future, for example, as the action.

Further, when the information presentation terminal 30 is a digital signage terminal or a user terminal, the CPU 302 can display the congestion level of the public facility 40 included in the facility congestion information on the display device 310. Accordingly, the CPU 302 can present the congestion level of the public facility 40 to a visitor visiting the public facility 40.

As described above, according to the present example embodiment, arrangement or working time of the public facility 40 is determined based on facility congestion information including a congestion level, time, and a characteristic of the public facility 40. Thus, according to the present example embodiment, it is possible to realize a more appropriate arrangement or a more appropriate working time of the public facility 40 and thus the optimal arrangement or the optimal working time of the public facility 40 run by public funds and thus expected for an appropriate arrangement or working time.

Other Example Embodiments

Figure 16:
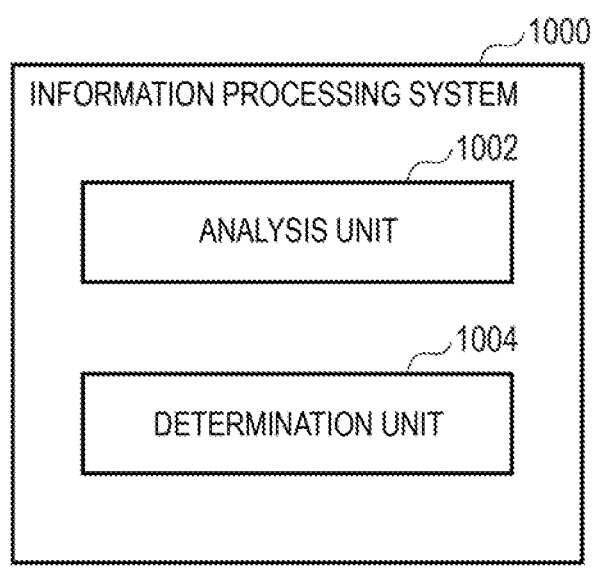
FIG. 16 is a block diagram illustrating a configuration of an information processing system according to another example embodiment of the present invention.

According to another example embodiment, the information processing system described in the above example embodiment may also be configured as illustrated in FIG. 16. FIG. 16 is a block diagram illustrating a configuration of an information processing system according to another example embodiment.

As illustrated in FIG. 16, an information processing system 1000 according to another example embodiment has an analysis unit 1002 and a determination unit 1004. The analysis unit 1002 analyzes a demand level of a plurality of reception desks based on a correlation between time and a characteristic of a visitor or a related item acquired from a video including the visitor visiting at least one facility including a plurality of different types of reception desks or the related item related to the visitor. The determination unit 1004 determines a distribution of personnel to the plurality of reception desks based on the demand level.

According to the information processing system 1000 of another example embodiment, a distribution of personnel to a plurality of reception desks is determined based on the demand level of a plurality of reception desks analyzed based on a correlation between a characteristic of a visitor or a related item and time. Therefore, according to the information processing system 1000, it is possible to realize a more appropriate distribution of personnel to a plurality of different types of reception desks.

Modified Example Embodiments

The present invention is not limited to the embodiments described above, and various modifications are possible.

For example, although the case of determining a distribution of staff to the reception desks 422 in the government office 42 of a local government has been described in the above first and second example embodiments, the case is not limited thereto. A distribution of personnel such as staff can be determined also for reception desks in a facility owned or managed by a nation, another public corporation, a private corporation, an individual, or the like in addition to a local government such as a local public organization in the same manner as in the cases of the first and second example embodiments.

Further, although the case of analyzing a demand level of the reception desk 422 by using a characteristic of a vehicle of a visitor as a related item related to the visitor has been described in the above first and second example embodiments, the case is not limited thereto. A demand level of the reception desk 422 can also be analyzed by using a characteristic of clothing, bags, an accessory, or the like of a visitor detected by image processing from a video captured by the image capture device 10, for example, in addition to a vehicle as a related item related to the visitor.

Further, although the case of determining arrangement or working time of the public facility 40 of a local government has been described in the above third example embodiment, the case is not limited thereto. Arrangement of working time of a facility can be determined also for a facility owned or managed by a nation, another public corporation, a private corporation, an individual, or the like in addition to a local government such as a local public organization in the same manner as in the third example embodiment.

Further, the scope of each of the example embodiments includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disc-read only memory (CD-ROM), a magnetic tape, a nonvolatile memory card, or a ROM can be used. Further, the scope of each of the example embodiments includes an example that operates on operating system (OS) to perform a process in cooperation with another software or a function of an add-in board without being limited to an example that performs a process by an individual program stored in the storage medium.

An example advantage according to the invention is that a more suitable distribution of personnel to a plurality of different types of reception desks can be realized.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

An information processing system comprising:

an analysis unit that analyzes a demand level of a plurality of reception desks based on a correlation between time and a characteristic of a visitor or a characteristic of a related item acquired from a video including the visitor visiting at least one facility including a plurality of different types of reception desks or the related item related to the visitor; and a determination unit that determines a distribution of personnel to the plurality of reception desks based on the demand level.

(Supplementary Note 2)

The information processing system according to supplementary note 3, wherein the analysis unit acquires the correlation based on a traffic line of the visitor or the related item measured from the video.

(Supplementary Note 3)

The information processing system according to supplementary note 1 or 2 further comprising a detection unit that detects the characteristic of the visitor or the characteristic of the related item from the video including the visitor or the related item.

(Supplementary Note 4)

The information processing system according to any one of supplementary notes 1 to 3, the at least one facility corresponds to a plurality of facilities.

(Supplementary Note 5)

The information processing system according to any one of supplementary notes 1 to 4, wherein the determination unit takes aptitude of the personnel into consideration to determine the distribution.

(Supplementary Note 6)

The information processing system according to any one of supplementary notes 1 to 5, wherein the determination unit takes into consideration of a facility where the personnel are stationed or a travel distance of the personnel to determine the distribution.

(Supplementary Note 7)

The information processing system according to any one of supplementary notes 1 to 6 further comprising a notification unit that provides a notification of information indicating the distribution.

(Supplementary Note 8)

The information processing system according to any one of supplementary notes 1 to 7, wherein the characteristic of the visitor includes at least one of an age, a sexuality, a moving speed, and presence or absence of baggage.

(Supplementary Note 9)

The information processing system according to any one of supplementary notes 1 to 8, wherein the facility is a government building of a government office.

(Supplementary Note 10)

The information processing system according to any one of supplementary notes 1 to 9 further comprising an image capture device that captures the video including the visitor or the related item.

(Supplementary Note 11)

An information processing method comprising:

analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and determining a distribution of personnel to the plurality of reception desks based on the demand level.

(Supplementary Note 12)

A non-transitory storage medium storing a program that causes a computer to perform:

analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and determining a distribution of personnel to the plurality of reception desks based on the demand level.

As described above, while the present invention has been described with reference to the example embodiments, the present invention is not limited to these example embodiments described above. Various modifications that can be appreciated by those skilled in the art can be made to the configuration and details of the present invention within the scope of the present invention.

What is claimed is:

1. An information processing system comprising:
   an analysis unit that analyzes a demand level of a plurality of reception desks based on a correlation between time and a characteristic of a visitor or a characteristic of a related item acquired from a video including the visitor visiting at least one facility including a plurality of different types of reception desks or the related item related to the visitor; and
   a determination unit that determines a distribution of personnel to the plurality of reception desks based on the demand level.

2. The information processing system according to claim 1, wherein the analysis unit acquires the correlation based on a traffic line of the visitor or the related item measured from the video.

3. The information processing system according to claim 1 further comprising a detection unit that detects the characteristic of the visitor or the characteristic of the related item from the video including the visitor or the related item.

4. The information processing system according to claim 1, the at least one facility corresponds to a plurality of facilities.

5. The information processing system according to claim 1, wherein the determination unit takes aptitude of the personnel into consideration to determine the distribution.

6. The information processing system according to claim 1, wherein the determination unit takes into consideration of a facility where the personnel are stationed or a travel distance of the personnel to determine the distribution.

7. The information processing system according to claim 1 further comprising a notification unit that provides a notification of information indicating the distribution.

8. The information processing system according to claim 1, wherein the characteristic of the visitor includes at least one of an age, a sexuality, a moving speed, and presence or absence of baggage.

9. The information processing system according to claim 1, wherein the facility is a government building of a government office.

10. The information processing system according to claim 1 further comprising an image capture device that captures the video including the visitor or the related item.

11. An information processing method comprising:
    analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and
    determining a distribution of personnel to the plurality of reception desks based on the demand level.

12. A non-transitory storage medium storing a program that causes a computer to perform:
    analyzing a demand level of a plurality of reception desks based on a correlation between time and a characteristic of a visitor or a characteristic of a related item acquired from a video including the visitor visiting at least one facility including a plurality of different types of reception desks or the related item related to the visitor; and
    determining a distribution of personnel to the plurality of reception desks based on the demand level.

* * * * *